Dec. 26, 1961   B. M. LITTLEHALE   3,014,628
PINCH-ROLL TAKE-OFF APPARATUS
Filed Dec. 7, 1959   4 Sheets-Sheet 2

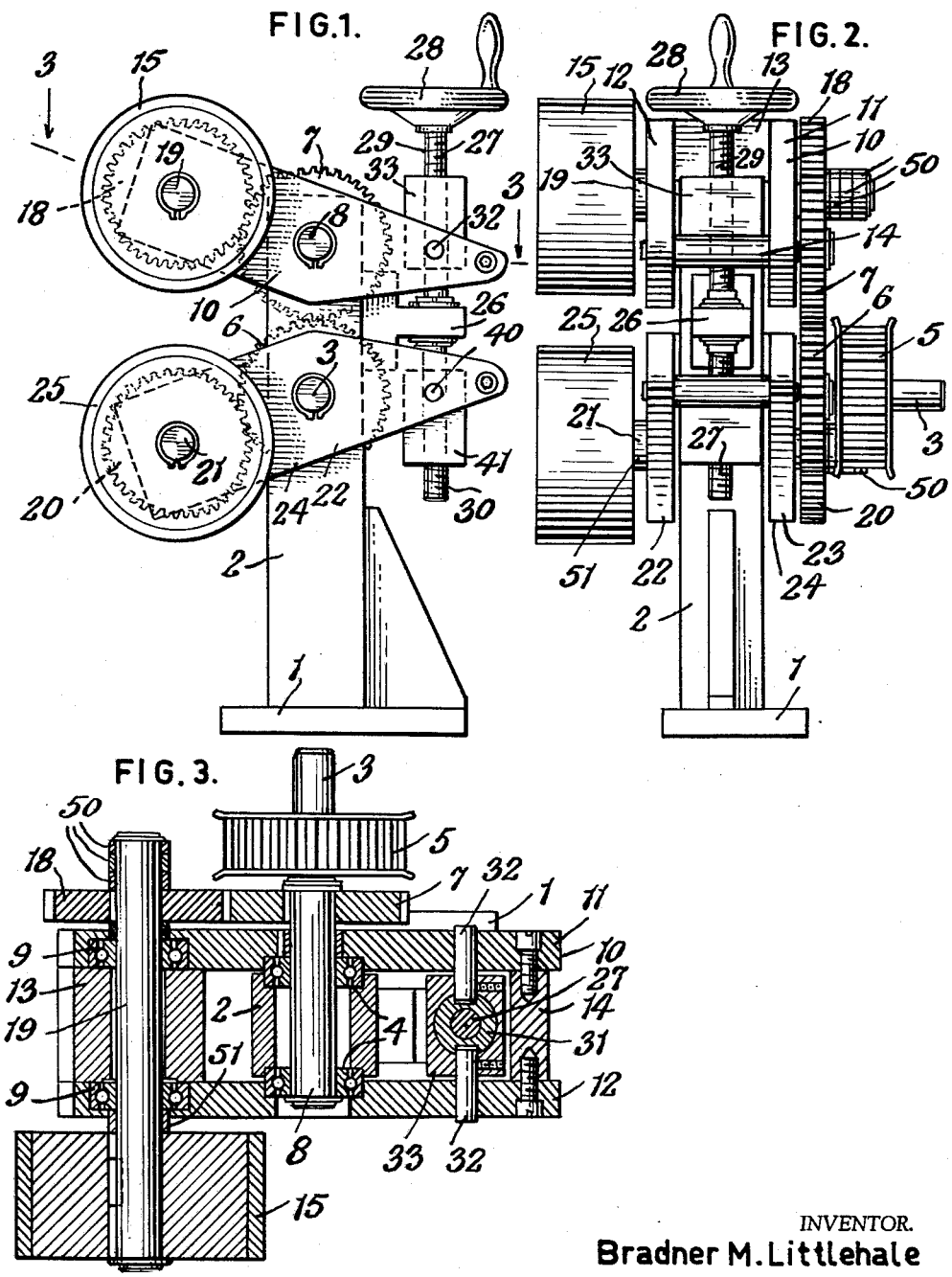

FIG.4.

INVENTOR.
Bradner M. Littlehale
BY Harry Radzinsky
   Attorney

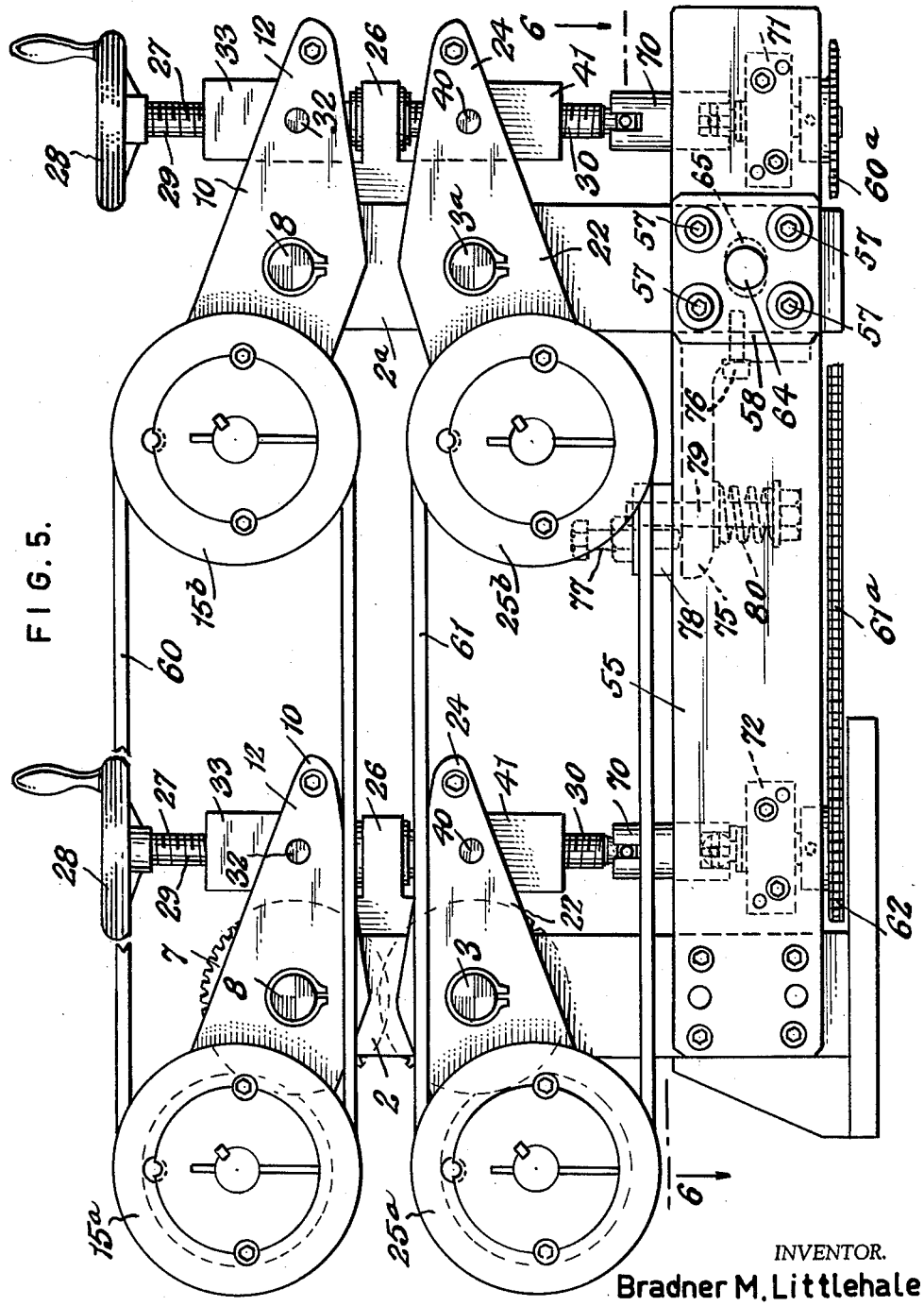

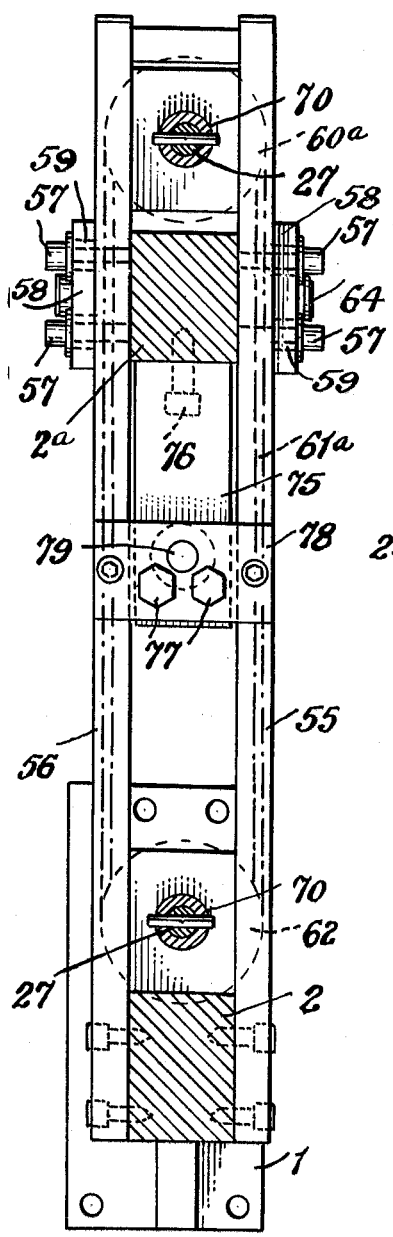
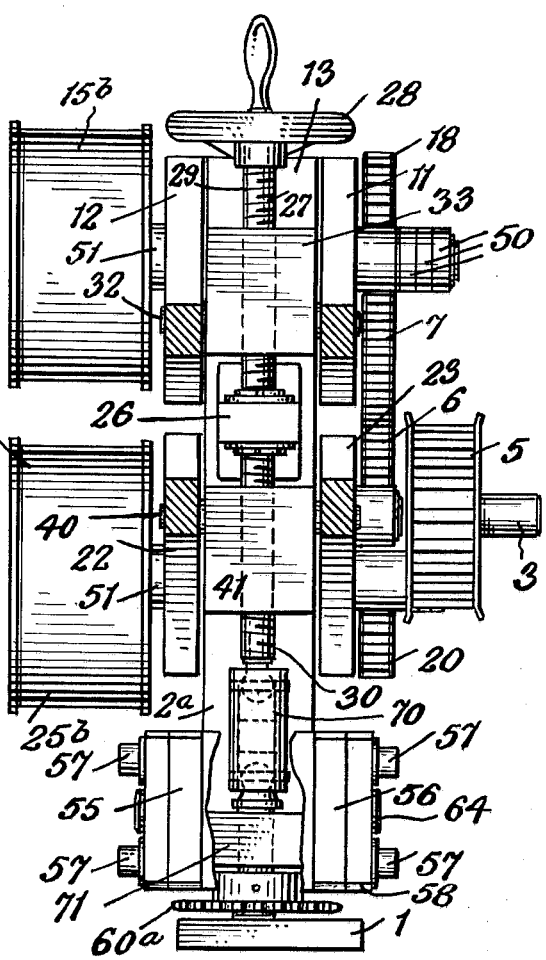

3,014,628
PINCH-ROLL TAKE-OFF APPARATUS
Bradner M. Littlehale, Chatham, N.J., assignor to Foster & Allen, Inc., Chatham, N.J., a corporation of New Jersey
Filed Dec. 7, 1959, Ser. No. 857,652
7 Claims. (Cl. 226—177)

This invention relates to pinch-roll take-off apparatus, and more particularly to an apparatus of this kind used for the purpose of pulling out of the extruder an extruded plastic element, such as a tube, rod or other cross section and feeding it to other apparatus, such as a cutter by which it is severed into desired lengths. In most cases a lengthy tank of water is employed between the extruder and the take-off device in order to solidify the plastic material.

The accuracy of the shape and dimensions of the extruded product are dependent upon the positive and uniform pull of the take-off apparatus. Hence, it follows that the take-off device must be precise, and additionally must be driven in a manner to avoid the possibility of fluctuations in the take-off speed. It is an object of the invention to provide an apparatus which will meet the above requirements.

It is an object of the invention to provide a device of this character which will be of relatively simple construction; which will be economical to build, and which factors have been achieved without sacrifice of precision and accuracy.

It is an object of the invention to provide, in an apparatus of this kind, an automatic safety device to prevent damage to the pinch rolls and shafts by the passage of an oversize piece of the material between the rolls.

It is still another object of the invention to provide an apparatus by which the extruded product will be accurately and positively fed, with both of the pinch rolls positively driven.

Still another object of the invention is to provide an apparatus by which adjustment of the distance between the pinch rolls to accommodate extrusions of different sizes and materials can be readily secured and during which adjustment both pinch rolls move equal distances from the center line between them so that the center line of all extrusions will always be at the same height and in line with the extruder die regardless of the size of the extrusion.

Another object of the invention is to provide in an apparatus of this character, a single driving belt of constant length, regardless of pinch-roll adjustment, thus facilitating the synchronizing of this apparatus with an extruder, cutter or other associated equipment.

Another object of the invention is to provide an arrangement by which the life of facings employed on the pinch rolls will be increased multifold.

Another object of the invention is to provide an apparatus in which two units thereof can be readily adapted to operate in tandem and connected by belts to give "caterpillar" traction to the extruded element.

Another object of the invention is to provide an arrangement by which a single pair of frictionless bearings serve simultaneously as bearings for pivoting the frame member and for rotating the drive shaft and thus securing accuracy with simplicity.

With these and other objects to be hereinafter set forth in view, I have devised the arrangement of parts to be described and more particularly pointed out in the claims appended hereto.

In the accompanying drawings, wherein illustrative embodiments of the invention are shown, FIG. 1 is a side elevational view of a pinch-roll take-off mechanism, constructed according to the invention;

FIG. 2 is a view taken at right angles to FIG. 1 as viewed from the right of FIG. 1;

FIG. 3 is a sectional view, taken substantially on the line 3—3 of FIG. 1, looking in the direction of the arrows;

FIG. 4 is an enlarged vertical sectional view through the apparatus;

FIG. 5 is a side elevational view of another embodiment of the invention;

FIG. 6 is a sectional view, taken substantially on the line 6—6 of FIG. 5, looking in the direction of the arrows, and FIG. 7 is a view taken at right angles to FIG. 5 and as viewed from the right of FIG. 5 but with some parts shown in section and other parts shown fragmentarily in order to disclose construction.

Figure 4:
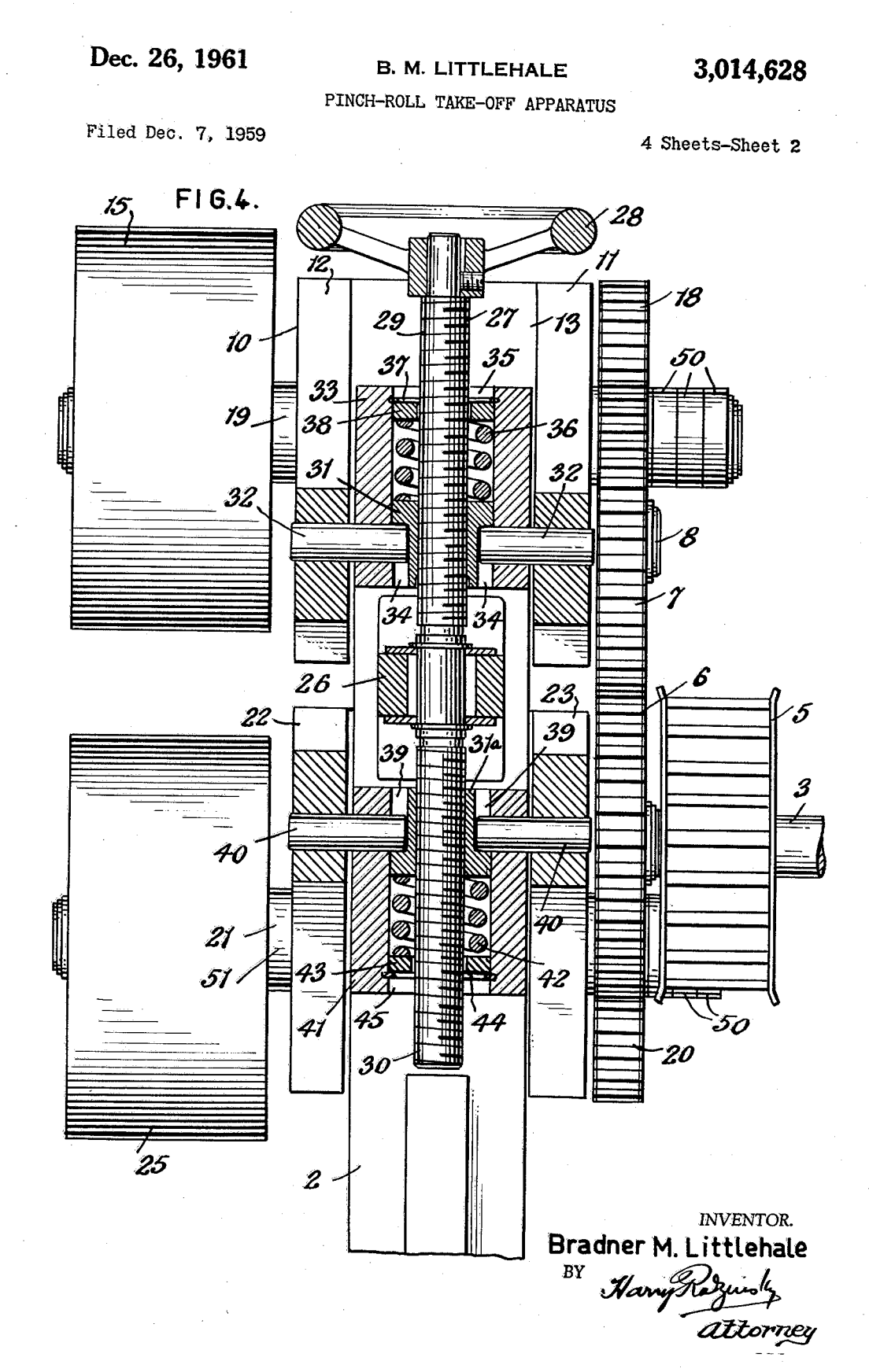

Referring to the drawings, and more particularly to the embodiment of the invention as disclosed in FIGS. 1 to 4 inclusive 1 indicates the base plate of the apparatus, and which is arranged to be mounted on a suitable supporting surface. Secured to and extending upwardly from the base 1 is an upright column or supporting post 2. Ball bearings are provided in the post and a drive shaft 3 is rotative therein, said shaft carrying a pulley 5 adapted to be engaged by a belt, not shown, but extending from a suitable power source, such as a variable speed electric motor.

Keyed on the drive shaft 3 is a gear 6 which meshes with and drives a similar gear 7, located above the gear 6 and rotative in the ball bearings 4 (FIG. 3) provided partially in the post 2 and partially in the plates of an upper roll-supporting frame generally indicated at 10. The ball bearings in which the drive shaft 3 is rotative are similarly mounted.

The upper roll-carrying frame 10 includes a pair of spaced, parallel side plates indicated respectively at 11 and 12 and disposed on opposite sides of the vertical post 2 and connected together in spaced relation by a spacing block 13 at one end, and a spacing rod 14 at the other end.

Gear 7 meshes with a similar gear 18 carried by a shaft 19, rotative in ball bearings 9 provided in the side plates 11 and 12 of the upper frame 10, and the shaft 19 has the upper pinch roll 15 keyed to it. The gear 6 meshes with a gear 20 carried on a shaft 21, similar to shaft 19, and shaft 21 is also mounted for rotation in ball bearings provided in the side plates 22 and 23 of the lower roll-carrying frame 24. Said frame 24 is constructed similarly to the upper frame 10, and shaft 21 carries the lower pinch roll 25 which roll is similar in size and shape to the upper pinch roll 15.

The drive shaft 3 passes through the lower roll-carrying frame 24 and constitutes the rotative axis for that frame, while shaft 8, passing similarly through the upper frame 10, constitutes the rotative axis for that frame. By rotative movement about their respective axes, the two frames 10 and 24 can be pivotally adjusted to bring the two rolls 15 and 25 toward or away from one another in a manner to be presently explained.

The pivoting of the roll-carrying frames 10 and 24 is around the axes of the shafts 3 and 8 and the positions of these shafts as well as the length of the driving belt that engages the pulley 5, are not altered regardless of the adjustment of the rolls to regulate the distance between them according to the size of the stock to be fed.

The arrangement of the ball bearings 4, surrounding the shaft 8, as well as a similar arangement of ball bearings for the drive shaft 3, wherein such bearings are disposed partially in the side plates of the frames 10 and 24 and partially in the upright 2, is particularly significant in that the bearings not only perform their function as frictionless rotating bearings for the respective drive shafts 3 and 8, but also serve as bearings for pivoting the two frames.

Mounted on the post 2 is a bracket 26 constituting a bearing for and through which an adjusting screw 27 is rotatively adjustable by means of the hand wheel 28 secured at its upper end.

The screw 27 has portions of opposite thread. That is to say, the upper portion shown at 29 can be of right-hand thread, while the lower portion, shown at 30 can be of left-hand thread. The adjusting screw 27 is in threadable engagement with two nuts, indicated respectively at 31 and 31a (FIG. 4) and when the adjustment screw 27 is rotated, the nuts will be adjusted toward or away from one another, according to the direction of rotation of the screw. Each of the plates 11 and 12 of the upper frame 10 carries an inwardly-extending pin 32, which pins pass through a block 33 having an axial passage 35 within which the nut 31 is slidably adjustable. The nut 31 is formed with diametrically opposite slots 34 and the inner end portions of the pins 32 extend into said slots. A coil spring 36, located in the opening 35 of the block 34 has one end operative against the upper end of the nut 31 and its opposite end urged against a washer 38 held in position against the end of the spring by means of a retaining ring 37.

A similar arrangement is provided for the lower roll-carrying frame 24, wherein nut 31a is formed with the diametrically-opposite slots 39 into which the end portions of the pins 40 extend, said pins being respectively secured in the side plates 22 and 23 and passing through the block 41 within which the nut 32 is axially adjustable. A coil spring 42, located in the axial opening 45 of the block 41, has one end operative against the lower end of the nut 32 and its opposite end urged against a washer 43 retained in place in the block 41 by means of the retaining ring 44.

The coil springs 36 and 42 serve to protect the pinch rolls and their shafts 19 and 21 from being damaged by forcible separation should an oversized piece of material come between the rolls. In such an event, both rolls 15 and 25 would move apart from center by compressing the springs 36 and 42. In further explanation of such movement, and considering the action only of the lower roll 25, it is stated that such roll would move downwardly, causing pivotal movement of the frame 24 about its axis 3, causing the opposite end of the frame 24 to move upwardly together with its pins 40, block 41, and exerting force against the lower end of the spring 42. The adjusting screw 27 and the nut 31a will not be moved, but the pins 40 are free to move upwardly in the slots 39 (FIG. 4) in the nuts 31a. Normally the pins 40 are held at the closed end or bottom of these slots, as shown in FIG. 4, by the force exerted by the spring 42.

In many cases, rubber facings are employed on the rolls 15 and 25, and means is provided in this apparatus, for materially lengthening the life of such rubber facings. In use, an extrusion, always travelling along the same line extending from the center line of the extruder die to the center line of the cutter or other apparatus, tends to wear a groove in the rolls along that line. In this apparatus, the pinch roll shafts 19 and 21 are each made of sufficient length to accommodate at one end several spacing rings indicated at 50. When the facing on the roll becomes worn as above described, one or more of these rings 50 can be removed from the right end, as viewed in FIGS. 2 and 4, of the shafts 19 and 21 and placed between spacer 51 and the pinch roll, thus moving the pinch roll away from the side of the frame and presenting an unworn roll surface on the center line of the extrusion. This can be repeated several times, and each repositioning of the roll serves to present an unworn part of the facing of the roll to the extrusion. By this means, and by reversing the positions of the rolls on their shafts, the rolls may be used until a substantial number, and as many as seven grooves, are worn in the facings.

From the foregoing, the operation and use of the apparatus will be apparent. The extrusions enter between the rolls 15 and 25 from the right, as viewed in FIG. 1, and are moved thereby from the extruder and to the cutting or other apparatus.

FIGS. 5, 6 and 7 of the drawings show another embodiment of the invention which provides so-called "Caterpillar" traction. For this purpose, two units of the construction and principles described with respect to the structure shown in FIGS. 1 to 4 inclusive are combined in tandem arrangement by making certain modifications as described below. While two rolls, precisely ground to identical size are highly useful for many feeding purposes, occasions arise when heavier extrusions must be fed and more traction is required than can be secured from a single pair of rolls. In such a case, the employment of "caterpillar" belts for the feeding purpose will be found desirable.

The structure shown at the left in FIG. 5, and constituting one of the units of the apparatus of that figure, is similar in most respects to that shown in FIGS. 1 to 4 inclusive. Similar reference characters are accordingly employed to designate the similar parts. It will be noted however, that in this construction the pinch roll 15 has been replaced by a timing belt pulley 15a, and the pinch roll 25 of FIGS. 1, 2 and 4 has been replaced by a timing belt pulley 25a. The part of the apparatus shown at the right in FIG. 5 and constituting the second unit is also similar to that shown in FIGS. 1 to 4 inclusive. It will be noted however, that in this construction not only are the pinch rolls 15 and 25 replaced by timing belt pulleys 15b and 25b, but also the gears 7 and 18 are entirely omitted since the belts shown at 60 and 61, extending respectively between the driven pulley 15a and the pulley shown at 15b and between the pulley 25a and the pulley 25b, serve to drive the pulleys 15b and 25b.

The part of the apparatus shown at the right in FIG. 5 includes an upright or post 2a supported at the bottom by the spaced-apart bars 55 and 56 which can be of any length. These bars maintain the upright or post 2a between them by means of the four screws 57 extending through over-sized holes in plates 58 and entering into tapped holes provided in the bars 55 and 56. The shaft 64 extends through the post 2a and through elongated slots 65 provided in the bars 55 and 56 and through plates 58. Screws 57 do not threadably engage the upright or post 2a so that the post and its associated parts can be moved toward the right, as viewed in FIG. 5, until the belts 60 and 61 are taut. Thereupon the screws 57, eight in number, are tightened to hold the parts in their adjusted position.

In this embodiment of the invention, each of the threaded adjusting screws 27 has a downward extension through a universal coupling 70. One of these couplings has an extension projecting through a bearing 71 and provided below the same with a sprocket 60a which is engaged by a chain 61a that extends about a sprocket 62 on a shaft extension from the second universal coupling indicated also at 70, the latter shaft extension being operative in the bearing shown at 72.

The two units of this apparatus are thus coupled together so that the manipulation of either one of the two hand wheels will correspondingly rotate the other hand wheel so that the adjustment of the spacing between the belts will thus be uniformly maintained.

In this embodiment of the invention, provision must be made for the possibility of a solid glob of the material striking the rear end portions of the belts first. This spreads the two rear pulleys 15b and 25b apart by the action of the spring release mechanism previously described in connection with adjusting screw 27 and in so doing increases the center distance between pulleys 15a and 15b and between 25a and 25b. This tends to tilt the upright column 2a forwardly toward column 2 because the belts 60 and 61 are of a non-stretching type. To accommodate this tendency, the rear assembly, or that shown at the right in FIG. 5, is pivoted on the shaft 64 extending between the two bars 55 and 56 and adjustable in the slots 65 therein. An angle-piece 75 is secured to the upright or post 2a by screws 76 and the front flange of the angle-piece is held against the adjustable stop 77 located in a cross-member 78 secured to the tops of the bars 55 and 56. A screw 79 extends downwardly from the cross member 78 and passes through the angle-piece 75, and a coil spring 80 surrounds the screw and holds the angle-piece in the normal position against stop 77 except when the column 2a is forced to tilt forward as described above.

In the embodiment shown in FIGS. 5 to 7 inclusive the belts 60 and 61 (which are shown as plain belts for simplicity in illustration) will customarily be of the caterpillar type to eliminate slippage. They can be made as long as required merely by increasing the length of bars 55 and 56. Idler pulleys (not shown) can also be placed along the length of the facing portions of the belts to maintain the required pressure on the extrusion between the two pairs of pulleys.

The described structure provides a precision pinch-roll take-off producing positive and uniform pull with no fluctuation of the take-off speed and with both pinch rolls positively driven. The device is of relatively simple construction; is economical to build and yet maintains a very high degree of precision and accuracy. The automatic safety means incorporated in the device serves to prevent damage to the pinch rolls and shafts should an oversized piece of the material pass between the rolls. The adjustment for the pinch rolls for different sizes of extruded sections and for different pressures on such sections is easily and quickly secured and during which adjustment both pinch rolls move equal distances from the center line between them so that the center lines of the extrusions, regardless of their size, are always at the same height in relation to the extruder die, cutter or other equipment.

Another feature of the described device is that it requires only one driving belt, and such belt of constant length regardless of pinch-roll adjustment. Such an arrangement facilitates the synchronizing of the device with the extruder, cutter or other associated equipment and the driving of the device by means of a motor or other drive previously owned by the user of the device. Moreover, it obviates the need for idlers or other means to compensate for changes in the position of the drive shaft, which often occurs in other take-off apparatus.

In a device of this construction the mounting of the pinch rolls is so arranged that the life of the contact surfaces of these rolls is greatly increased; two units of the device can be readily adapted to operate in tandem and connected by "Caterpillar" belts to thereby give traction to the extruded element. It is also to be noted that a device as herein described requires only a single pair of frictionless bearings to serve simultaneously as bearings for pivoting the frame member and for rotating the drive shaft, thus securing accuracy with simplicity.

Having described several embodiments of the invention, it is obvious that the same is not to be restricted thereto, but is broad enough to cover all structures coming within the scope of the annexed claims.

What I claim is:

1. A pinch-roll take-off apparatus comprising, an upright post, a pair of frames pivotally mounted one above the other on the post, each frame including spaced-apart side plates, a roll rotatively carried by each frame near one end of the frame, a pin projecting laterally from each side plate of each frame, a spring seat located in each frame near the end of each frame remote from the end where the roll is located, each spring seat being carried by a pair of the pins, each spring seat having a central opening, a nut slidably mounted in each opening, each nut having diametrically-opposite slots into which ends of the pins extend, a spring in the opening in each of the spring seats, each spring being operative against one of the nuts to hold the nut in engagement with a pair of the pins, and an adjustment screw extending through the nuts for adjustably causing pivotal movement of the frames to bring the rolls carried thereby toward or away from one another.

2. A pinch-roll take-off apparatus comprising, a support, a pair of frames pivotally mounted one above the other on the support, a roll rotatively carried by each of the frames, a shaft on which each of the rolls is mounted, a gear on each of the shafts, a drive shaft on which the lowermost frame is pivotally mounted, said drive shaft carrying a gear in mesh with one of the gears on one of the roll-carrying shafts, a pivot shaft for the upper frame, a gear on said pivot shaft, said last-mentioned gear being in mesh with the gear on the roll-carrying shaft of the upper frame and also being in mesh with the gear carried by the drive shaft, threaded adjusting means by which the frames are both pivotally moved to thereby move the rolls toward or away from one another, and a resilient coupling between each of the frames and said threaded adjusting means.

3. A pinch-roll take-off apparatus comprising, a support, upper and lower frames pivoted on the support, each of the frames carrying a pinch-roll near one end, means for rotating the rolls, means for adjusting the degree of separation between the rolls comprising an adjusting screw, two nuts threadably engaging the screw and adjustable toward or away from one another by rotative movement of the screw, and spring means for establishing a resilient coupling between each of the frames and the nuts to thereby permit separation of the rolls under excess pressure in opposition to the force imposed by the resilient couplings.

4. In a pinch-roll take-off apparatus as provided for in claim 3, wherein said spring means includes a block having a central passage in which one of the nuts is axially adjustable, a spring in said passage exerting resilient force against the nut, each nut having diametrically-opposite slots, the frames having projecting pins passing through the block and entering the slots, and the springs acting to maintain the nuts against those parts of the pins that are positioned in the slots.

5. In a pinch-roll take-off apparatus, a support, a frame pivotally mounted thereon, a ball-bearing partially mounted in the frame and partially mounted in the support, a pivot shaft for the frame extending through the ball-bearing, a pinch-roll rotatively mounted at one end of the frame, adjusting means for the frame near its opposite end, and a resilient connection between the frame and the adjusting means for permitting a limited pivotal movement of the frame without affecting the adjusting means.

6. A pinch-roll take-off apparatus comprising, a vertically-extending supporting post, a pair of frames mounted one above the other on the post, the pivots of said frames being in vertical alignment, a roll rotatively mounted on each of the frames adjacent to one end and to one side of the post, a shaft on which each roll is mounted, the shafts being rotatable in the frames, a drive shaft extending through the post and through the lowermost of the frames, the drive shaft constituting the pivotal axis for said lowermost frame, a second shaft extending through the post and passing through the upper frame and constituting the pivotal axis for said upper frame, gearing on all of the shafts for rotating all of the same, a bracket mounted on the post between the frames and adjacent to the ends thereof opposite to the ends which carry the rolls, a vertically-positioned adjusting screw rotative in the bracket, said screw having upper and lower portions which are of opposite thread, a nut threadably mounted on the lower threaded part of the adjusting screw, a nut threadably mounted on the upper part of said screw, a tubular block located between and mounted on parts of the upper frame and in which the upper nut is axially movable by its adjustment on the screw, a similar tubular block mounted between and on parts of the lower frame, a nut mounted on the lower threaded part of the screw and axially movable through the last-mentioned block, and springs located in each of the blocks for resiliently opposing movement of the frames.

7. A pinch-roll take-off apparatus comprising, a supporting post, a pair of frames pivotally mounted one above the other on the post, a roll rotatively mounted on each of the frames, a shaft on which each roll is mounted, the shafts being rotatable in the frames, a drive shaft extending through the post and through one of the frames, means for rotating the drive shaft, said drive shaft constituting the pivotal axis for the frame through which it extends, a second shaft extending through the post and through the second frame and constituting the pivotal axis for the latter frame, gearing on the several shafts for rotating all of said shafts, threadable means for pivoting the frames to adjusted positions by bringing the rolls toward or away from one another, and means for resiliently coupling both of the frames to the threadable means to permit of limited pivotal movement of the frames without effecting the position of the threadable means, said resilient coupling means consisting of nuts adjustable on the threadable means, pin-and-slot connections between the nuts and the frames, springs operative against the nuts to urge them against the pins, and seats for the springs, said seats being carried by the pins.

References Cited in the file of this patent

UNITED STATES PATENTS

| | | |
|---|---|---|
| 1,696,037 | Hornberger | Dec. 18, 1928 |
| 2,525,590 | Collins | Oct. 10, 1950 |
| 2,595,879 | Pasquier | May 6, 1952 |
| 2,751,069 | Goodman | June 19, 1956 |
| 2,875,890 | Good | Mar. 3, 1959 |
| 2,915,171 | Peck | Dec. 1, 1959 |
| 2,957,574 | Compton | Oct. 25, 1960 |

FOREIGN PATENTS

| | | |
|---|---|---|
| 1,117,058 | France | May 16, 1956 |